US008670751B2

(12) United States Patent
Ge et al.

(10) Patent No.: US 8,670,751 B2
(45) Date of Patent: Mar. 11, 2014

(54) METHOD, SYSTEM AND TERMINAL FOR REALIZING MULTIMEDIA COLOR RING BACK TONE SERVICE IN IMS DOMAIN

(75) Inventors: Hao Ge, Shenzhen (CN); Song Zheng, Shenzhen (CN); Biao Pan, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 223 days.

(21) Appl. No.: 13/128,076

(22) PCT Filed: Aug. 24, 2009

(86) PCT No.: PCT/CN2009/073455
§ 371 (c)(1),
(2), (4) Date: May 6, 2011

(87) PCT Pub. No.: WO2010/051712
PCT Pub. Date: May 14, 2010

(65) Prior Publication Data
US 2011/0222678 A1     Sep. 15, 2011

(30) Foreign Application Priority Data

Nov. 7, 2008    (CN) .......................... 2008 1 0176411

(51) Int. Cl.
| H04M 1/725 | (2006.01) |
| H04M 3/42 | (2006.01) |
| H04M 1/56 | (2006.01) |
| H04M 1/00 | (2006.01) |
| H04M 1/38 | (2006.01) |

(52) U.S. Cl.
USPC ................. 455/412.2; 455/567; 379/217.01; 379/207.16; 379/142.01; 379/373.01

(58) Field of Classification Search
USPC ............ 455/412.2, 567; 379/217.01, 207.16, 379/142.01, 373.01
See application file for complete search history.

(56) References Cited

U.S. PATENT DOCUMENTS

| 2007/0121595 | A1 | 5/2007 | Batni et al. | |
| 2007/0121916 | A1* | 5/2007 | Wang et al. | 379/373.01 |
| 2007/0127642 | A1 | 6/2007 | Bae et al. | |
| 2007/0127655 | A1* | 6/2007 | Jung et al. | 379/142.01 |
| 2007/0211872 | A1* | 9/2007 | Cai et al. | 379/142.01 |

(Continued)

FOREIGN PATENT DOCUMENTS

| CN | 1909686 A | 2/2007 |
| CN | 101076148 A | 11/2007 |

(Continued)

OTHER PUBLICATIONS

ETS I TS 123 218 V7.8.0 (Jan. 2008);"Digital cellular telecommunications system (Phase 2+); Universal Mobile Telecommunications System (UMTS); IP Multimedia (IM) session handling; IM call model; Stage 2 (3GPP TS 23.218 version 7.8.0 Release 7)"; © European Telecommunications Standards Institute 2008.

*Primary Examiner* — Christopher M Brandt
*Assistant Examiner* — Muthuswamy Manoharan
(74) *Attorney, Agent, or Firm* — McClure, Qualey & Rodack, LLP (57) ABSTRACT

The present invention provides a method, terminal and system for implementing a multimedia coloring ring back tone (MCRBT) service in IMS domain. This method comprises: after receiving a call from a caller, a core network setting up a connection with a MCRBT service system when the callee is called if determining that the callee subscribes the MCRBT service; said MCRBT service system triggering the MCRBT service, and sending an address of a MCRBT file set by said callee through said core network; and said caller downloading said MCRBT file from a media resource server of said MCRBT service system according to said address, and enjoying said MCRBT file from a calling terminal when a called terminal rings. The present invention can meet the requirement of the caller of enjoying the MCRBT file set by the callee when the caller calls the callee of IMS domain, and better services are provided.

15 Claims, 3 Drawing Sheets

(56) References Cited

U.S. PATENT DOCUMENTS

2008/0293390 A1* 11/2008 Yang et al. .................. 455/414.1
2009/0185669 A1* 7/2009 Zitnik et al. ............. 379/217.01

FOREIGN PATENT DOCUMENTS

| | | | |
|---|---|---|---|
| CN | 101119337 A | 2/2008 | |
| CN | 101404787 A | 4/2009 | |
| EP | 1677501 A1 | 7/2006 | |
| KR | 2004-0095838 * | 11/2004 | ............... H04Q 7/24 |
| KR | 10-0747709 | 8/2007 | |
| WO | WO 2005043926 * | 5/2005 | |

* cited by examiner

METHOD, SYSTEM AND TERMINAL FOR REALIZING MULTIMEDIA COLOR RING BACK TONE SERVICE IN IMS DOMAIN

CROSS REFERENCE RELATED APPLICATIONS

This application is a national phase of PCT/CN2009/073455 filed Aug. 24, 2009 which claims priority to China Application Serial No. 200810176411.0, filed Nov. 7, 2008, both of which are entirely incorporated herein by reference.

TECHNICAL FIELD

The present invention relates to the value-added telecommunication services, and particularly, to a system, terminal and method for implementing the multimedia coloring ring back tone service in IP Multimedia Subsystem (IMS) domain.

BACKGROUND OF THE RELATED ART

IMS is a system merging data, voice and mobile networks on the basis of Session Initiated Protocol (SIP), and is a real-time service in the present Universal Mobile Telecommunications System (UMTS) packet switching domain. IMS makes the flexible service capability of the IP take root in the mobile communication system, thus greatly enriching the mobile communication service generating capability.

The coloring ring back tone service develops successively, and is well applied in IMS domain which is rapidly developing at present, namely the multimedia coloring ring back tone service. Currently, the multimedia coloring ring back tone service has been implemented in IMS domain, which mainly includes: the audio and video coloring ring back tone service. However, as a kind of multimedia coloring ring back tone, the picture coloring ring back tone service has not been implemented yet so far.

SUMMARY OF THE INVENTION

The technical problem to be solved in the present invention is to provide a method, system and terminal for implementing multimedia coloring ring back tone service in IMS domain, which makes the caller enjoy the multimedia coloring ring back tone set by the callee when the caller calls the callee of IMS domain, and thereby better services are provided to the subscribers.

In order to solve the above technical problem, the present invention provides a method for implementing a multimedia coloring ring back tone service in IMS domain, and the method comprises:

A. after receiving a call from a caller, a core network of IMS domain judging whether a callee subscribes the multimedia coloring ring back tone service, and if yes, at the same time when the callee is called, setting up a connection with a coloring ring back tone service system;

B. the coloring ring back tone service system triggering the coloring ring back tone service, and sending an address of a multimedia coloring ring back tone file set by the callee to the caller through the core network; and C. the caller downloading the multimedia coloring ring back tone file from a media resource server of the coloring ring back tone service system according to the address, and enjoying the multimedia coloring ring back tone file from a calling terminal when a called terminal rings.

Furthermore, the core network comprises a calling core network device AS_A and a called core network device AS_B, the step A comprises: after receiving an Invite message, the AS_B knowing by inquiring of a Home Subscriber Server (HSS) that the callee is a subscriber subscribing the multimedia coloring ring back tone service, and then sending the Invite message to the callee through the AS_A; and at the same time, sending the Invite message to the coloring ring back tone service system, the message including a coloring ring back tone service access code;

the step B comprises: the coloring ring back tone service system triggering the coloring ring back tone service according to the coloring ring back tone service access code, obtaining by inquiring of a system server an address of storing the multimedia coloring ring back tone file, and sending the address by the Invite message through the AS_B to the caller; and the step C comprises: the caller downloading the multimedia coloring ring back tone file to a local folder to enjoy through a Hyper Text Transfer Protocol according to the address.

Furthermore, the step C further comprises: when the caller fails to download the multimedia coloring ring back tone file, the caller enjoying a local default multimedia file.

Furthermore, the multimedia coloring ring back tone file is an audio file, or a picture file, or a video file.

Furthermore, the multimedia coloring ring back tone file is an audio and picture file, or an audio and video file.

To solve the above technical problem, the present invention provides a system for implementing a picture coloring ring back tone service in IMS domain, comprising: a core network in IMS domain, a calling terminal and a called terminal, and a coloring ring backing tone service system, wherein:

the core network is used for after receiving a call from the calling terminal, if it is judged that the called terminal subscribes the multimedia coloring ring back tone service, at the same time when the called terminal is called, setting up a connection with the coloring ring back tone service system; and after receiving an address of a coloring ring back tone picture file set by the called terminal sent by the coloring ring back tone service system, forwarding the address to the calling terminal;

the coloring ring back tone service system is used for triggering and controlling a picture coloring ring back tone service, and sending an address of picture coloring ring back tone file to the calling terminal through the core network;

the calling terminal is used for downloading the picture file from the media resource server according to this address, and displaying this coloring ring back tone picture when the called terminal rings.

To solve the above technical problem, the present invention provides a core network system for implementing a multimedia coloring ring back tone service in IMS domain, the core network system comprising a calling core network device and a called core network device, wherein:

the core network system is configured to after receiving a call from a caller, judge whether a callee subscribes the multimedia coloring ring back tone service, and if yes, at the same time when the callee is called, set up a connection with a coloring ring back tone service system; and after receiving an address of a multimedia coloring ring back tone file set by the callee sent by the coloring ring back tone service system, forward the address to the caller, and thereby the caller downloads the multimedia coloring ring back tone file from a media resource server according to the address, and enjoys the multimedia coloring ring back tone file when a called terminal rings.

Furthermore, the multimedia coloring ring back tone file is an audio file, or a picture file, or a video file.

Furthermore, the multimedia coloring ring back tone file is an audio and picture file, or an audio and video file.

To solve the above technical problem, the present invention provides a terminal for implementing a multimedia coloring ring back tone service in IMS domain, and the terminal being configured to subscribe the multimedia coloring ring back tone service; and when the terminal acts as a caller, call a callee through the core network system, receive an address of a multimedia coloring ring back tone file set by the callee from the core network system, download the multimedia coloring ring back tone file from the media resource server according to the address, and enjoy the multimedia coloring ring back tone file when a called terminal rings.

Furthermore, the multimedia coloring ring back tone file is an audio file, or a picture file, or a video file.

Furthermore, the multimedia coloring ring back tone file is an audio and picture file, or an audio and video file.

To solve the above technical problem, the present invention provides a multimedia coloring ring back tone service system for implementing a multimedia coloring ring back tone service in IMS domain, and the system comprising a coloring ring back tone service server and a media resource server connected with each other; wherein:

the coloring ring back tone service server is configured to trigger the multimedia coloring ring back tone service according to a service access code, and send an address of a multimedia coloring ring back tone file that is obtained by inquiry to a core network, and control an operation of the media resource server downloading the multimedia coloring ring back tone file; and the media resource server is configured to save the multimedia coloring ring back tone file uploaded by a multimedia coloring ring back tone service subscriber under control of the coloring ring back tone service server, and provide a downloading service of the multimedia coloring ring back tone file.

Furthermore, the multimedia coloring ring back tone service system further comprises a Web server connected with the coloring ring back tone service server, and the Web server is configured to provide an interface in a Web page way: to be provided to a system administrator to upload the multimedia ring back tone file to the media resource server and carry out customized amendment to multimedia ring back tone service data; or to be provided to the subscriber subscribing the multimedia coloring ring back tone to carry out operations of previewing, subscribing and setting the multimedia ring back tone file with authorization of an operator or the subscriber subscribing the multimedia ring back tone service; and the media resource server is also configured to provide the downloading service of the multimedia coloring ring back tone file in a Hyper Text Transfer Protocol.

Furthermore, the multimedia coloring ring back tone service system further comprises an interface machine respectively connected with the multimedia coloring ring back tone service server, the media resource server and the Web server, and the interface machine is configured to:

upload through a file uploading interface the multimedia coloring ring back tone file to the media resource server by the Web page;

forward through a coloring ring back tone core interface operating commands of previewing, subscribing and setting by the Web page by the subscriber subscribing the multimedia coloring ring back tone service to the multimedia coloring ring back tone service server for processing; and access the coloring ring back tone service system into a short message center through a short message interface.

Furthermore, the multimedia coloring ring back tone file is an audio file, or a picture file, or a video file.

Furthermore, the multimedia coloring ring back tone file is an audio and picture file, or an audio and video file.

The system and method provided in the present invention can meet the requirement of the caller of viewing the coloring ring back tone picture set by the callee when the caller calls the callee of IMS domain, and thereby better services are provided to subscribers, and the telecommunication value-added services are extended.

PREFERRED EMBODIMENTS OF THE PRESENT INVENTION

The method for implementing the picture coloring ring back tone services in IMS domain according to the present invention involves a coloring ring back tone service server, a media resource server, a calling terminal/called terminal and a calling/called core network device AS in IMS domain; and the method comprises steps of: a call from the calling terminal to the called terminal being connected to the core network; the core network judging that the called terminal has subscribed the picture coloring ring back tone service, and at the same time when the called terminal is called, setting up the connection with the coloring ring back tone service system; the coloring ring back tone service system triggering the service, and sending the address of the coloring ring back tone picture file set by the called terminal to the core network; the calling terminal receiving the address of the coloring ring back tone picture file through the core network, and adopting the HTTP to download this picture file from the media resource server; and when the called terminal rings, the calling subscriber enjoying the coloring ring back tone picture from the terminal.

Below it will explain and illustrate the above technical scheme of the present invention with reference to the figures and preferred examples in detail.

Figure 1:
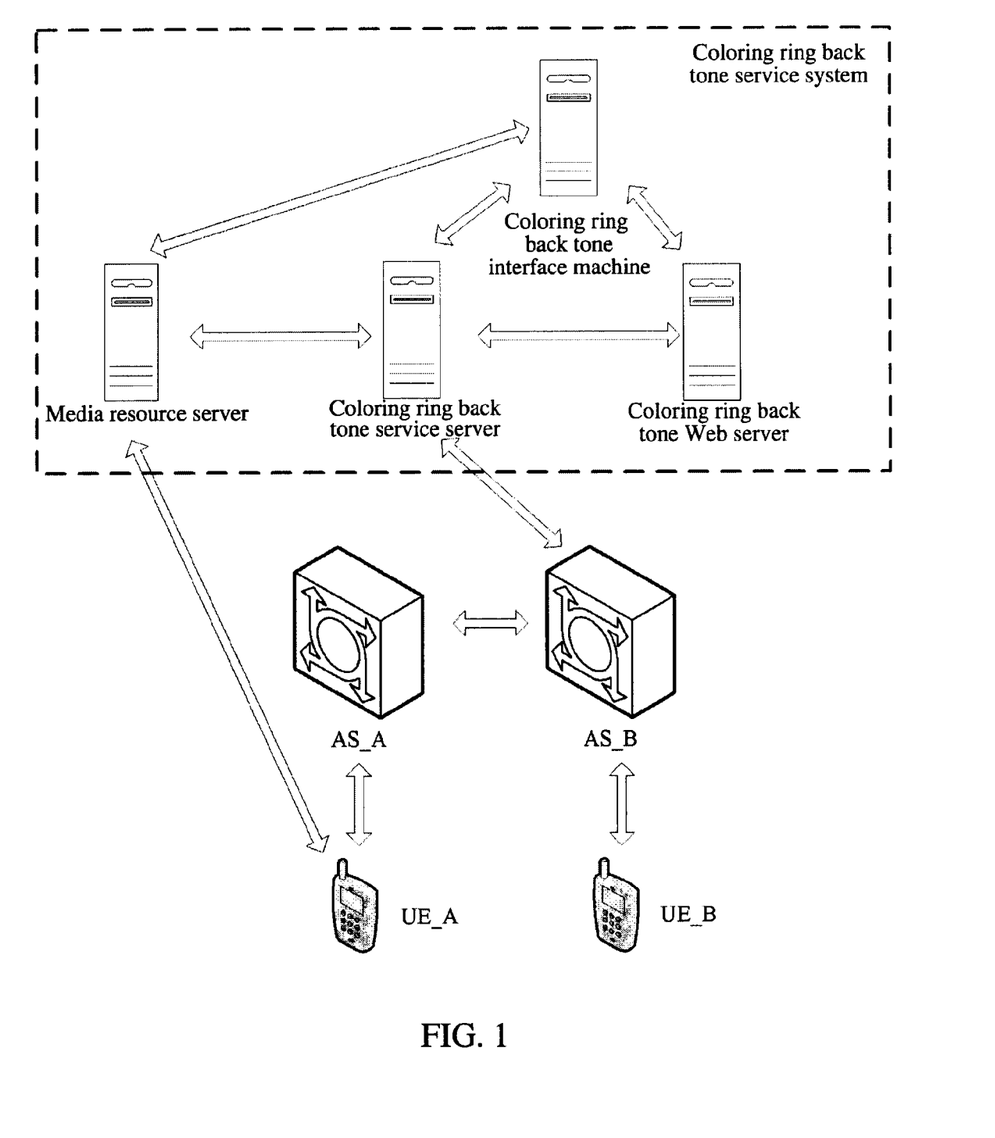
FIG. 1 is a structure schematic diagram of the system for implementing the picture coloring ring back tone services in IMS domain according to the present invention.

As shown in FIG. 1, the system for implementing the picture coloring ring back tone services in IMS domain according to the present invention comprises: the coloring ring back tone service system, and the calling terminal UE_A and called terminal UE_B, the calling core network device AS_A and the called core network device AS_B in IMS domain.

The coloring ring back tone service system comprises the coloring ring back tone service server, the coloring ring back tone Web server, the coloring ring back tone interface machine and the media resource server; wherein:

The coloring ring back tone service server is connected to the coloring ring back tone Web server, the coloring ring back tone interface machine and media resource server respectively, and the coloring ring back tone service server is used to trigger said picture coloring ring back tone service according to a service access code, send the address of the coloring ring back tone picture file that is known by inquiry to the core network, and control the media resource server in the operations of downloading or uploading the coloring ring back tone picture file, and at the same time, provide an interface with the coloring ring back tone Web server to allow the operators or terminal subscribers to carry out the authorized customized amendment to the service data on the coloring ring back tone service server.

The coloring ring back tone Web server is used to provide the interface for the operator or subscriber in a Web page way, and this interface is provided for use by the system administrator to carry out the customized amendment to the coloring ring back tone service data with the authorization of the operators or terminal subscribers and upload the coloring ring back tone file to the media resource server, and is used for operations such as preview, subscription and setting the picture coloring ring back tone file and so on by the coloring ring back tone subscribers.

The coloring ring back tone interface machine is also connected to the coloring ring back tone Web server and the media resource server, and the coloring ring back tone interface machine is used to forward the operating commands such as previewing, subscribing and setting and so on carried out by the subscribers by the Web page to the coloring ring back tone service server through the coloring ring back tone core interface; to send the picture coloring ring back tone file uploaded by the Web page through the coloring ring back tone file uploading interface to the media resource server; and to access the coloring ring back tone service system into the short message center through the short message interface.

The media resource server is used to store the uploaded picture coloring ring back tone resources file under the control of the coloring ring back tone service server, and provide the download services in a HTTP way.

The calling AS_A is used to connect the call from the calling UE_A to the called UE_B to the called AS_B; while the called AS_B is used to, at the same time when the called UE_B is called, set up the connection with the coloring ring back tone service server to trigger the picture coloring ring back tone service upon judging that the called UE_B subscribes the picture coloring ring back tone service.

All the core network device ASs comprise the Home Subscriber Server (HSS), IMS core subsystem (PSS, PSTN/ISDN simulation subsystem), and Call Server Control Function (CSCF); wherein the HSS is responsible for saving the subscription information of IMS subscriber, including data such as: the basic identifier, and routing information and so on; the PSS is responsible for the core control logic of IMS system; and the CSCF is responsible for the basic session routing function.

Figure 2:
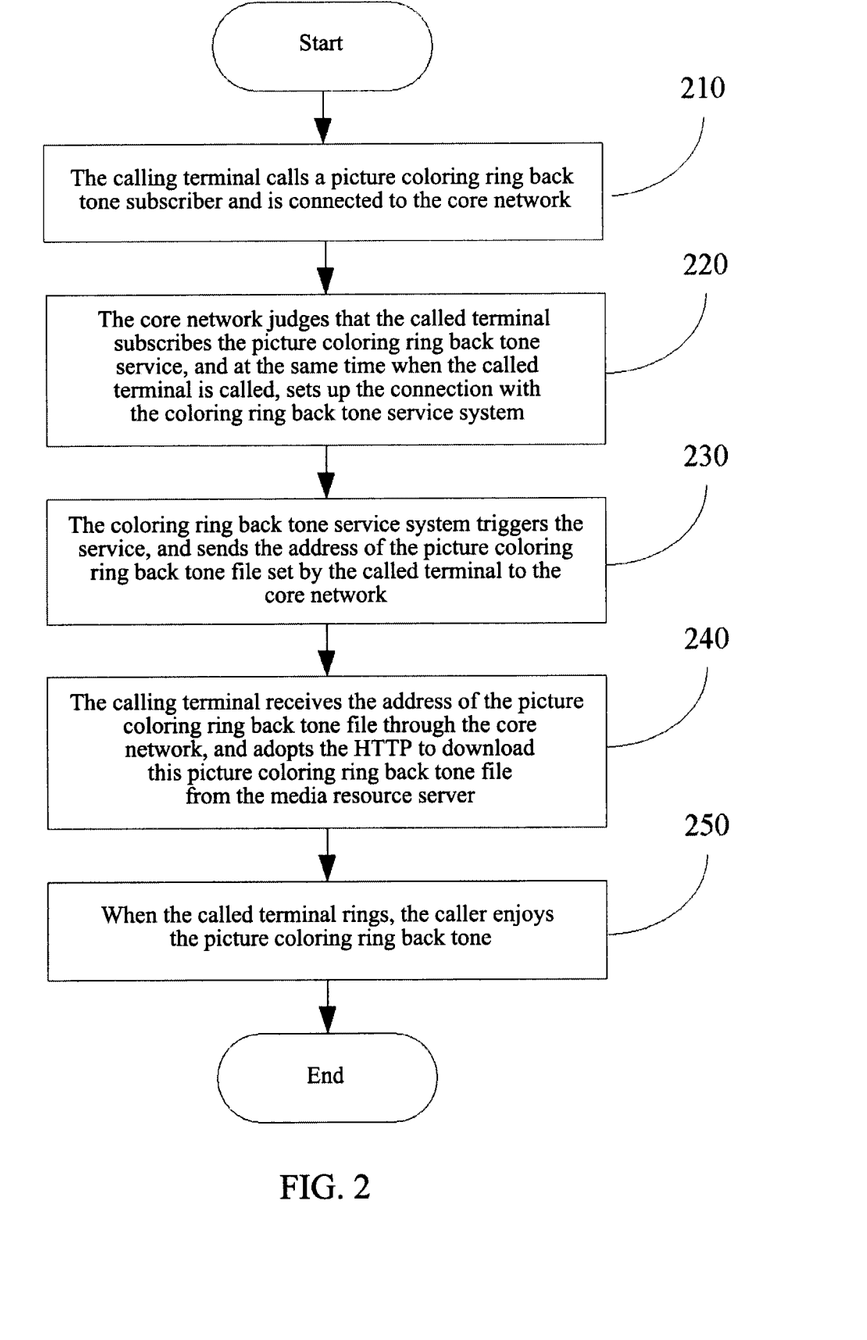
FIG. 2 is a flow chart of the method for implementing the picture coloring ring back tone services in IMS domain according to the present invention.

FIG. 2 is a flow chart of the method for implementing the picture coloring ring back tone services according to the present invention, comprising the following steps:

210: a call from the caller to the callee is connected to the core network;

220: the core network judges that the callee subscribes the picture coloring ring back tone service, and at the same time when the callee is called, sets up the connection with the coloring ring back tone service system.

Namely, after receiving the Invite message, the called core network device AS_B knows by inquiring of the HSS that the callee is a subscriber subscribing the picture coloring ring back tone service, and then sends the Invite message to the called terminal through the calling AS_A; at the same time, the AS_B sends the Invite message to the coloring ring back tone service system, and the Invite message includes the coloring ring back tone service access code.

230: the coloring ring back tone service system triggers the service, and sends the address of the picture coloring ring back tone file set by the callee to the core network;

Namely, the coloring ring back tone service system triggers the coloring ring back tone service according to the coloring ring back tone service access code, obtains by inquiring of the server the storage address of the picture coloring ring back tone file set by this subscriber, and sends this address by the 200 Invite message to the AS_B.

240: the calling terminal receives the address of the picture coloring ring back tone file through the core network, and adopts the HTTP to download this picture coloring ring back tone file from the media resource server.

Namely after receiving the address of the picture coloring ring back tone file, the calling terminal downloads this picture to the local folder by the HTTP.

250: when the called terminal rings, the caller enjoys the picture coloring ring back tone from the terminal.

If the calling terminal fails to download this picture file, the terminal displays a local default picture file.

Figure 3:
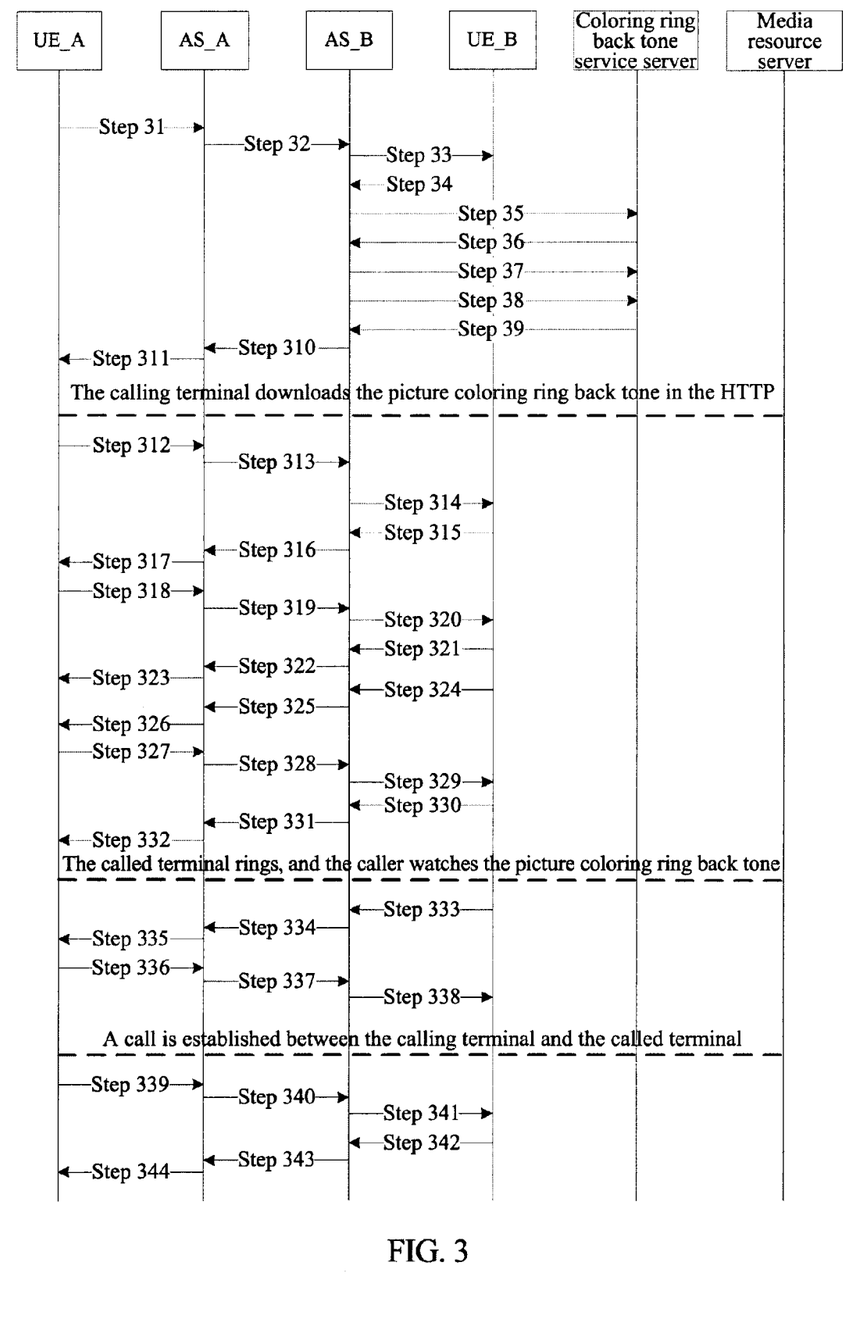
FIG. 3 is a flow chart of the coloring ring back tone calling services according to a method example of the present invention.

FIG. 3 is a particular application example of the method of the present invention in FIG. 2, namely, a practical flow of triggering the coloring ring back tone service when the calling UE_A calls the called UE_B, comprising:

Step 31: the UE_A initiates a call to the UE_B, and sends an Invite message to the calling core network device AS_A, the message including the media sdpA of the UE_A;

Step 32: the AS_A forwards the Invite message to the called core network device AS_B, the message including the media sdpA of the UE_A;

Step 33: the AS_B sends the Invite message to the UE_B, the message including the media sdpA of the UE_A;

Step 34: the UE_B replies a 183 message to the AS_B, the message including the media negotiation result sdpBA;

Step 35: the AS_B inquires the subscriber subscription information, and finds that the subscriber B subscribes the picture coloring ring back tone service, and then sends an Invite message to the coloring ring back tone service server, the message including the coloring ring back tone service access code.

Step 36: the coloring ring back tone service server triggers the picture coloring ring back tone service according to the service access code, obtains by inquiry the address of the picture coloring ring back tone file set by this subscriber, replies a 200 OK message (in response to the Invite message) to the AS_B, the 200 OK message including the address of the picture coloring ring back tone file encapsulated in the Call-Info field.

Step 37: the AS_B sends an Ack message to the coloring ring back tone service server to indicate a confirmation for the 200 Invite message.

Step 38: the AS_B sends a Bye message to the coloring ring back tone service server to end calling the coloring ring back tone service server;

Step 39: the coloring ring back tone service server replies a 200 OK (in response to the Bye message) message to the AS_B;

Steps 310-311: the AS_B sends a 183 message to the UE_A through the AS_A, the 183 message including the address of the picture coloring ring back tone file encapsulated in the Call-Info field and sdpBA; after receiving this 183 message, the UE_A downloads the file by HTTP according to the address of picture coloring ring back tone;

Steps 312-314: the UE_A sends a Prack message to the UE_B through the AS_A and AS_B;

Steps 315-317: the UE_B sends a 200 Prack message to the UE_A through the AS_B and AS_A;

Steps 318-320: the UE_A reserves resources successfully, and sends an Update message to the UE_B through the AS_A and AS_B, the Update message including the to-be-updated media sdpAB';

Steps 321-323: the UE_B replies a 200 OK (in response to the Update message) message to the UE_A through the AS_B and AS_A, the 200 OK message including the updated media sdpBA';

Steps 324-326: the UE_B sends a 180 message to the UE_A through the AS_B and the AS_A; and the UE_B starts to ring.

Steps 327-329: the UE_A sends a Prack message to the UE_B through the AS_A and the AS_B;

Steps 330-332: the UE_B sends a 200 OK (in response to the Prack message) message to the UE_A through the AS_B and AS_A; and the AS_A starts to display the picture coloring ring back tone, and can play a local audio file as the ring back tone;

Steps 333-335: the UE_B responds by sending a 200 OK (in response to the Invite message) message to the UE_A through the AS_B and AS_A;

Steps 336-338: the UE_A replies an Ack message to the UE_B through the AS_A and AS_B to make a confirmation; and thus a call is established between the calling terminal and called terminal;

Steps 339-341: the calling UE_A hands off, and the UE_A sends a Bye message to the UE_B through the AS_A and AS_B;

Steps 342-344: the UE_B sends a 200 OK (in response to the Bye message) message to the UE_A through the AS_B and AS_A.

To sum up, it can be seen that the system and method provided in the present invention can make the caller view the coloring ring back tone picture set by the callee when calling the caller of IMS domain, and thereby making the subscriber enjoy better services, and having the telecommunication value-added services further developed.

Besides, it is easy to think of that the callee can also subscribe the audio and video coloring back tone service, and at this time, the caller can download the audio and video file through the similar method flow, and displays these files when waiting for a response from the callee. Thus, when the caller calls the callee, the caller can enjoy the corresponding type of downloaded files during waiting according to the different coloring ring back tone services subscribed by the callee.

Certainly, the present invention can also have other various examples. Various corresponding modifications and transformations can be made to the present invention by those having ordinary skills in the art without departing from the spirit and essence of the present invention, and the corresponding modifications and transformations, however, shall all fall into the protection scope of the appended claims of the present invention.

INDUSTRIAL APPLICABILITY

The system and method of the present invention can meet the requirement of the caller of viewing the coloring ring back tone picture set by the callee when calling the callee of IMS domain, and thereby providing better services to subscribers, and extending the telecommunication value-added services.

What is claimed is:

1. A method for implementing a multimedia coloring ring back tone service in IP Multimedia Subsystem (IMS) domain via a coloring ring back tone service system, and said method comprising:
   a) after receiving a call from a caller, a core network of the IMS domain judging whether a callee subscribes to the multimedia coloring ring back tone service, and if yes, at the same time when the callee is called, setting up a connection with said coloring ring back tone service system;
   b) said coloring ring back tone service system triggering the coloring ring back tone service, and sending an address of a multimedia coloring ring back tone file set by said callee to said caller through said core network, wherein, said coloring ring back tone service system is separated from the core network and the callee, and does not communicate with the callee before the sending; and
   C) said caller downloading said multimedia coloring ring back tone file from a media resource server of said coloring ring back tone service system according to said address, and enjoying said multimedia coloring ring back tone file from a calling terminal when a called terminal rings; wherein, said coloring ring back tone service system comprises a coloring ring back tone service server, said media resource server, a Web server, and an interface machine; wherein: said coloring ring back tone service server is connected to the media resource server, the Web server, and the interface machine respectively, and configured to trigger said multimedia coloring ring back tone service according to a service access code, and send an address of a multimedia coloring ring back tone file that is obtained by inquiry to the core network, and control an operation of said media resource server downloading said multimedia coloring ring back tone file;
   said media resource server is configured to save the multimedia coloring ring back tone file uploaded by a multimedia coloring ring back tone service subscriber under control of the coloring ring back tone service server, and provide a downloading service of said multimedia coloring ring back tone file in a Hyper Text Transfer Protocol;
   said Web server is connected with said coloring ring back tone service server, and configured to provide an interface in a Web page to upload said multimedia coloring ring back tone file to said media resource server, wherein the interface of the Web server is provided for use by a system administrator to upload said multimedia ring back tone file to said media resource server and carry out customized amendment to multimedia ring back tone service data with the authorization of the operators or terminal subscribers; and/or provided for use by said subscriber subscribing the multimedia coloring ring back tone to carry out operations of previewing, subscribing and setting said multimedia ring back tone file; and said interface machine is respectively connected with said multimedia coloring ring back tone service server, said media resource server, and said Web server, and said interface machine is configured to: send, through a file uploading interface, said multimedia coloring ring back tone file uploaded by said Web page to said media resource server, forward, through a coloring ring back tone core interface, operating commands of previewing, subscribing and setting by said Web page by said subscriber subscribing to the multimedia coloring ring back tone service to said multimedia coloring ring back tone service server for processing, and access said coloring ring back tone service system into a short message center through a short message interface.

2. The method as claimed in claim 1, wherein said core network comprises a calling core network device AS_A and a called core network device AS_B, said step A comprises: after receiving an Invite message, said AS_B knowing by inquiring of a Home Subscriber Server (HSS) that said callee is a subscriber subscribing to the multimedia coloring ring back tone service, and then sending the Invite message to said callee through said AS_A; and at the same time, sending the Invite message to said coloring ring back tone service system, said message including a coloring ring back tone service access code;

said step B comprises: said coloring ring back tone service system triggering said coloring ring back tone service according to said coloring ring back tone service access code, obtaining by inquiring of a system server an address of storing said multimedia coloring ring back tone file, and sending said address by the Invite message through said AS_B to the caller; and said step C comprises: said caller downloading said multimedia coloring ring back tone file to a local folder to enjoy through a Hyper Text Transfer Protocol according to said address.

3. The method as claimed in claim 2, wherein said step C further comprises: when said caller fails to download said multimedia coloring ring back tone file, said caller enjoying a local default multimedia file.

4. The method as claimed in claim 2, wherein said multimedia coloring ring back tone file is an audio file, or a picture file, or a video file, or an audio and picture file, or an audio and video file.

5. The method as claimed in claim 1, wherein said step C further comprises: when said caller fails to download said multimedia coloring ring back tone file, said caller enjoying a local default multimedia file.

6. The method as claimed in claim 1, wherein said multimedia coloring ring back tone file is an audio file, or a picture file, or a video file, or an audio and picture file, or an audio and video file.

7. A core network system for implementing a multimedia coloring ring back tone service in IP Multimedia Subsystem (IMS) domain via a coloring ring back tone service system, said core network system comprising a calling core network device and a called core network device, wherein:

said core network system is configured to after receiving a call from a caller, judge whether a callee subscribes to the multimedia coloring ring back tone service, and if yes, at the same time when the callee is called, set up a connection with said coloring ring back tone service system; and after receiving an address of a multimedia coloring ring back tone file set by said callee sent by said coloring ring back tone service system, forward said address to said caller, and thereby said caller downloads said multimedia coloring ring back tone file from a media resource server according to said address, and enjoys said multimedia coloring ring back tone file when a called terminal rings;

wherein, said coloring ring back tone service system is separated from the core network and the callee; and comprises a coloring ring back tone service server, said media resource server, a Web server, and an interface machine; wherein:

said coloring ring back tone service server is connected to the media resource server, the Web server, and the interface machine respectively, and configured to trigger said multimedia coloring ring back tone service according to a service access code, and send an address of a multimedia coloring ring back tone file that is obtained by inquiry to a core network, and control an operation of said media resource server downloading said multimedia coloring ring back tone file;

said media resource server is configured to save the multimedia coloring ring back tone file uploaded by a multimedia coloring ring back tone service subscriber under control of the coloring ring back tone service server, and provide a downloading service of said multimedia coloring ring back tone file in a Hyper Text Transfer Protocol;

said Web server is connected with said coloring ring back tone service server, and configured to provide an interface in a Web page to upload said multimedia coloring ring back tone file to said media resource server, wherein the interface of the Web server is provided for use by a system administrator to upload said multimedia ring back tone file to said media resource server and carry out customized amendment to multimedia ring back tone service data with the authorization of the operators or terminal subscribers; and/or provided for use by said subscriber subscribing the multimedia coloring ring back tone to carry out operations of previewing, subscribing and setting said multimedia ring back tone file; and said interface machine is respectively connected with said multimedia coloring ring back tone service server, said media resource server, and said Web server, and said interface machine is configured to: send, through a file uploading interface, said multimedia coloring ring back tone file uploaded by said Web page to said media resource server, forward, through a coloring ring back tone core interface, operating commands of previewing, subscribing and setting by said Web page by said subscriber subscribing to the multimedia coloring ring back tone service to said multimedia coloring ring back tone service server for processing, and access said coloring ring back tone service system into a short message center through a short message interface.

8. The core network system as claimed in claim 7, wherein said multimedia coloring ring back tone file is an audio file, or a picture file, or a video file.

9. The core network system as claimed in claim 7, wherein said multimedia coloring ring back tone file is an audio and picture file, or an audio and video file.

10. A terminal for implementing a multimedia coloring ring back tone service in IP Multimedia Subsystem (IMS) domain via a coloring ring back tone service system, and said terminal being configured to:

subscribe to the multimedia coloring ring back tone service; and when the terminal acts as a caller, call a callee through said core network system as claimed in claim 6, receive an address of a multimedia coloring ring back tone file set by said callee from said core network system, download the multimedia coloring ring back tone file from a media resource server of said coloring ring back tone service system according to the address, and enjoy said multimedia coloring ring back tone file when a called terminal rings, wherein the address of a multimedia coloring ring back tone file is sent from said coloring ring back tone service system being separated from the core network system and the terminal to the caller through the core network system; when the terminal acts as a callee, does not communicate with the coloring ring back tone service system before the address of a multimedia coloring ring back tone file is sent;

wherein, said coloring ring back tone service system comprises a coloring ring back tone service server, said media resource server, a Web server, and an interface machine; wherein: said coloring ring back tone service server is connected to the media resource server, the Web server, and the interface machine respectively, and configured to trigger said multimedia coloring ring back tone service according to a service access code, and send an address of a multimedia coloring ring back tone file that is obtained by inquiry to a core network, and control an operation of said media resource server downloading said multimedia coloring ring back tone file;

said media resource server is configured to save the multimedia coloring ring back tone file uploaded by a multimedia coloring ring back tone service subscriber under control of the coloring ring back tone service server, and provide a downloading service of said multimedia coloring ring back tone file in a Hyper Text Transfer Protocol;

said Web server is connected with said coloring ring back tone service server, and configured to provide an interface in a Web page to upload said multimedia coloring ring back tone file to said media resource server, wherein the interface of the Web server is provided for use by a system administrator to upload said multimedia ring back tone file to said media resource server and carry out customized amendment to multimedia ring back tone service data with the authorization of the operators or terminal subscribers; and/or provided for use by said subscriber subscribing the multimedia coloring ring back tone to carry out operations of previewing, subscribing and setting said multimedia ring back tone file; and said interface machine is respectively connected with said multimedia coloring ring back tone service server, said media resource server, and said Web server, and said interface machine is configured to: send, through a file uploading interface, said multimedia coloring ring back tone file uploaded by said Web page to said media resource server, forward, through a coloring ring back tone core interface, operating commands of previewing, subscribing and setting by said Web page by said subscriber subscribing to the multimedia coloring ring back tone service to said multimedia coloring ring back tone service server for processing, and access said coloring ring back tone service system into a short message center through a short message interface.

11. The terminal as claimed in claim 10, wherein said multimedia coloring ring back tone file is an audio file, or a picture file, or a video file.

12. The terminal as claimed in claim 10, wherein said multimedia coloring ring back tone file is an audio and picture file, or an audio and video file.

13. A multimedia coloring ring back tone service system for implementing a multimedia coloring ring back tone service in IP Multimedia Subsystem (IMS) domain, and said system comprising a coloring ring back tone service server, a media resource server, a Web server, and an interface machine; wherein: said coloring ring back tone service server is connected to the media resource server, the Web server, and the interface machine respectively, and configured to trigger said multimedia coloring ring back tone service according to a service access code, and send an address of a multimedia coloring ring back tone file that is obtained by inquiry to a core network, and control an operation of said media resource server downloading said multimedia coloring ring back tone file; said media resource server is configured to save the multimedia coloring ring back tone file uploaded by a multimedia coloring ring back tone service subscriber under control of the coloring ring back tone service server, and provide a downloading service of said multimedia coloring ring back tone file in a Hyper Text Transfer Protocol;

said Web server is connected with said coloring ring back tone service server, and configured to provide an interface in a Web page to upload said multimedia coloring ring back tone file to said media resource server, wherein the interface of the Web server is provided for use by a system administrator to upload said multimedia ring back tone file to said media resource server and carry out customized amendment to multimedia ring back tone service data with the authorization of the operators or terminal subscribers; and/or provided for use by said subscriber subscribing to the multimedia coloring ring back tone to carry out operations of previewing, subscribing and setting said multimedia ring back tone file; and said interface machine is respectively connected with said multimedia coloring ring back tone service server, said media resource server, and said Web server, and said interface machine is configured to send, through a file uploading interface, said multimedia coloring ring back tone file uploaded by said Web page to said media resource server, forward, through a coloring ring back tone core interface, operating commands of previewing, subscribing and setting by said Web page by said subscriber subscribing the multimedia coloring ring back tone service to said multimedia coloring ring back tone service server for processing, and access said coloring ring back tone service system into a short message center through a short message interface.

14. The system as claimed in claim 13, wherein said multimedia coloring ring back tone file is an audio file, or a picture file, or a video file, or an audio and picture file, or an audio and video file.

15. The system as claimed in 13, wherein said multimedia coloring ring back tone file is an audio file, or a picture file, or a video file, or an audio and picture file, or an audio and video file.

* * * * *